United States Patent [19]
Friedrichs et al.

[11] Patent Number: 5,588,773
[45] Date of Patent: Dec. 31, 1996

[54] DEVICE FOR CONNECTING A MACHINE ELEMENT TO A STRUCTURAL MEMBER MOVABLE ABOUT ITS LONGITUDINAL AXIS SO THAT THE MACHINE ELEMENT AND THE STRUCTURAL MEMBER ARE SECURED AGAINST RELATIVE ROTATION

[75] Inventors: Jens Friedrichs, Heidelberg; Karl-Heinz Helmstädter, Sinsheim, both of Germany

[73] Assignee: Heidelberger Druckmaschinen AG, Heidelberg, Germany

[21] Appl. No.: 249,549

[22] Filed: May 26, 1994

[30] Foreign Application Priority Data

May 26, 1993 [DE] Germany ............... 43 17 429.9

[51] Int. Cl.⁶ ................................................. B41F 21/04
[52] U.S. Cl. .............. 403/373; 24/135 N; 101/409; 403/256; 403/370; 403/374; 403/409.1
[58] Field of Search ................ 24/135 A, 135 N, 24/135 R, 278; 101/409, 410, 411, 412; 248/405, 411; 285/421; 403/191, 256, 370, 373, 374, 394, 409.1, DIG. 9

[56] References Cited

U.S. PATENT DOCUMENTS

| | | | |
|---|---|---|---|
| 1,057,428 | 4/1913 | Hinds et al. ............... | 403/191 |
| 1,412,187 | 4/1922 | Lopdell ............... | 24/278 |
| 2,194,800 | 10/1937 | Ley ............... | 24/278 X |
| 2,459,436 | 1/1949 | Krasberg ............... | 24/278 |
| 2,578,008 | 12/1951 | Judd ............... | 24/135 R |
| 2,928,344 | 3/1960 | Dietrich et al. ............... | 101/412 |
| 3,682,472 | 8/1972 | Barthel ............... | 271/254 |
| 4,058,307 | 11/1977 | Bubley et al. ............... | 271/85 |
| 4,110,054 | 8/1978 | Moeller, Jr. ............... | 403/373 |
| 4,354,399 | 10/1982 | Katayama ............... | 403/373 X |
| 4,364,588 | 12/1982 | Thompson ............... | 285/419 |
| 4,592,279 | 6/1986 | Kemmerer ............... | 101/412 |
| 4,636,104 | 1/1987 | Dinh ............... | 403/191 |
| 4,718,342 | 1/1988 | Raab et al. ............... | 101/409 |
| 4,718,343 | 1/1988 | Gensheimer et al. ............... | 101/409 |
| 4,813,353 | 3/1989 | Raab et al. ............... | 101/410 |
| 4,846,061 | 7/1989 | Jeschke et al. ............... | 101/409 X |
| 5,396,423 | 3/1995 | Quinci et al. ............... | 101/409 |

FOREIGN PATENT DOCUMENTS

| | | |
|---|---|---|
| 0437211 | 7/1991 | European Pat. Off. . |
| 435454 | 12/1911 | France ............... 403/191 |
| 2661459 | 10/1991 | France ............... 403/373 |
| 1133191 | 7/1962 | Germany . |
| 1938405 | 5/1966 | Germany . |
| 551932 | 3/1943 | United Kingdom ............... 24/278 |
| 778484 | 7/1957 | United Kingdom . |
| 2074643 | 11/1981 | United Kingdom ............... 403/373 |

*Primary Examiner*—Blair Johnson
*Assistant Examiner*—Andrea Chop
*Attorney, Agent, or Firm*—Herbert L. Lerner; Laurence A. Greenberg

[57] ABSTRACT

Device for connecting a machine element to a structural member, which is movable about a longitudinal axis thereof, so that the machine element and the structural member are secured against relative rotation, includes a tension band firmly connected to a machine element and embracing more than 180° of a circumference of the structural member, and a thrust piece having an inner side matching the circumference of the structural member, the thrust piece extending across a part of the circumference of the structural member other than a part thereof embraced by the tension band, and at least one clamping device to which the tension band is fixed for radially clamping the thrust piece against the structural member.

7 Claims, 2 Drawing Sheets

DEVICE FOR CONNECTING A MACHINE ELEMENT TO A STRUCTURAL MEMBER MOVABLE ABOUT ITS LONGITUDINAL AXIS SO THAT THE MACHINE ELEMENT AND THE STRUCTURAL MEMBER ARE SECURED AGAINST RELATIVE ROTATION

BACKGROUND OF THE INVENTION

FIELD OF THE INVENTION

The invention relates to a device for connecting a machine element to a structural member movable about a longitudinal axis thereof so that the machine element and the structural member are secured against relative rotation. In particular, the invention relates to a device for clamping a machine element at a circumference of a hollow shaft preferably of a sheet-fed printing press so that the machine element is fixed, at one of an infinite number of phase-angle settings, against torsion relative to the hollow shaft, the hollow shaft being movable about a longitudinal axis thereof for clamping a gripper stop on a gripper bar of the sheet-fed printing press.

Clamping a machine element on a structural member in an infinitely adjustable manner with respect to the angle of rotation thereof so as to withstand a torque load and, in particular, recurring loads, without varying the position of the machine element with respect to the structural member, requires great frictional forces between the mutually engaging clamping surfaces and correspondingly great radial clamping forces. The reliable mounting or supporting of the machine element on the structural member so that it is fixed against torsion relative thereto is rendered difficult by the fact that the cross section of the structural member is round or rounded at the clamping location to permit the machine element to be clamped in any one of an infinite number of angular positions or settings, and yet there must be no occurrence of any deformation of the clamped cross-section thereof. Heretofore known are clamping straps which embrace or are slung or looped about the structural member at the clamping location. These known clamping straps are formed with thickened ends which are disposed opposite one another with respect to a gap extending approximately in an axial plane wherein the longitudinal axis of the structural member is disposed and which are clampable with respect to one another perpendicularly to the gap by means of one clamping bolt or a plurality thereof, so that the clamping strap is pressed against the circumference of the structural member. With such a clamping strap, the clamping forces acting in various circumferential regions radially upon the structural member are very different from one another the clamping forces reaching peak values primarily at the edges of the gap so that hollow shafts suffer deformations quite readily at the cross-section thereof, which results in the impairment of inner bearings. Such disadvantages are primarily to be avoided with respect to gripper bars in printing presses or other sheet-processing machines wherein, by means of such conventional clamping straps, stops for sheet grippers are fastened onto a hollow shaft wherein a control shaft is mounted possibly without play, said control shaft being provided for the sheet grippers and being driven so as to swing about the longitudinal axis thereof. Deformations of the hollow shaft disrupt the smooth operation of the inner shaft. In printing-press technology, the relatively bulky or cumbersome form of construction which hinders the motion of other structural members represents another disadvantage. Clamping straps of the conventional type have a relatively large cross-section in the region thereof at which they embrace or are slung about the shaft and, above all, at the thickened ends thereof, thereby, in connection with high accelerations, producing a high moment of inertia which has a negative effect upon the dynamic gripper behavior.

Although it has been known heretofore to use clips for connecting the ends of hoses formed of flexible material or for connecting a hose end and a fitting, as disclosed, for example, in the German Published Non-Prosecuted Patent Application (DE-OS) 26 19 179, such clips are not suited for providing a torque-transmitting connection.

SUMMARY OF THE INVENTION

It is accordingly an object of the invention to provide a device for connecting a machine element to a structural member, such as another machine part, movable about a longitudinal axis thereof so that the machine element and the structural member are secured against relative rotation, and especially such a device which is compact and space-saving, and is suitable for affording a torque-transmitting connection between the machine element and the structural member, and which avoids any deformation of the structural member which is being subjected to a clamping force.

With the foregoing and other objects in view, there is provided, in accordance with the invention, a device for connecting a machine element to a structural member, which is movable about a longitudinal axis thereof, so that the machine element and the structural member are secured against relative rotation, comprising a tension band firmly connected to a machine element and embracing more than 180° of a circumference of the structural member, and a thrust piece having an inner side matching the circumference of the structural member, the thrust piece extending across a part of the circumference of the structural member other than a part thereof embraced by the tension band, and at least one clamping device to which the tension band is fixed for radially clamping the thrust piece against the structural member.

In accordance with another feature of the invention, the tension band is a steel belt.

In accordance with a further feature of the invention, the clamping device is formed of a clamping bolt having a bolt part and a nut part threaded thereon, the steel belt being fixed to the nut part of the clamping bolt, and the bolt part of the clamping bolt being turnable by an attachable tool.

In accordance with an added feature of the invention, there is provided in a printing press, a device for clamping a machine element at the circumference of a hollow shaft oscillatorily movable about a central longitudinal axis thereof, at one of an infinite number of phase angles with respect to the hollow shaft, so that the machine element and the hollow shaft are secured against relative rotation, comprising a steel belt embracing more than 180° of the circumference of the hollow shaft and being firmly connected to the machine element, a thrust piece having an inner side matching the circumferential profile of the hollow shaft, and at least one clamping bolt having a bolt part and a nut part threaded thereon, the steel belt being fixed to the nut part of the clamping bolt, and the bolt part of the clamping bolt being turnable so as to clamp the thrust piece radially with respect to the central longitudinal axis of the hollow shaft.

In accordance with an additional feature of the invention, the machine element is a gripper stop, and the hollow shaft is a gripper bar of a sheet-fed printing press.

In accordance with yet another feature of the invention, the steel belt is more readily deformable than the gripper bar.

In accordance with yet a further feature of the invention, the steel belt is formed as an endless loop, the nut part of the clamping bolt is braced against an inner side of the endless loop, and the thrust piece is braced against an outer cylindrical surface of the gripper bar, the clamping bolt being effective between the nut part thereof and the thrust piece.

In accordance with yet an added feature of the invention, the steel belt has two ends, both of which are fixed to the nut part of the clamping bolt.

In accordance with yet an additional feature of the invention, the ends of the steel belt are bent at an angle to the steel belt, the bent ends, respectively, engaging behind the nut part.

In accordance with a concomitant feature of the invention, the nut part of the clamping bolt is formed with at least one projection, and wherein the ends of the steel belt are bent at an angle to the steel belt, the bent ends, respectively, engaging behind the at least one projection.

With the device according to the invention, by supporting or bracing, on the steel-belt section in circumferential direction, the clamping force which is introduced by the thrust piece, the radial clamping forces act almost uniformly on the hollow shaft or the like, thus virtually avoiding any deformation of the cross section of the hollow shaft. With a gripping or looping angle greater than 180°, the drawing or pulling ends of the steel belt run towards one another, so that the tensile force produces radial components, in particular, transversely to the introduced clamping force. The adaptability of the thin steel belt to the cross section of the hollow shaft also contributes to the uniform distribution of forces. This embodiment of the invention has a proportionately low moment of inertia. Only little space is needed in the vicinity of the steel belt for accommodating a device having the inventive features. Assembly of the device is relatively easy. No safety mechanism is necessary for securing the clamping bolt against loosening automatically, because the elastic deformation of the steel belt has the effect of an expansion bolt. The machine element, such as a gripper stop, for example, is clampable in any angular position infinitely on the structural member which, for example, may be a gripper bar.

Other features which are considered as characteristic for the invention are set forth in the appended claims.

Although the invention is illustrated and described herein as embodied in a device for connecting a machine element to a structural member movable about a longitudinal axis thereof so that the machine element and the structural member are secured against relative rotation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
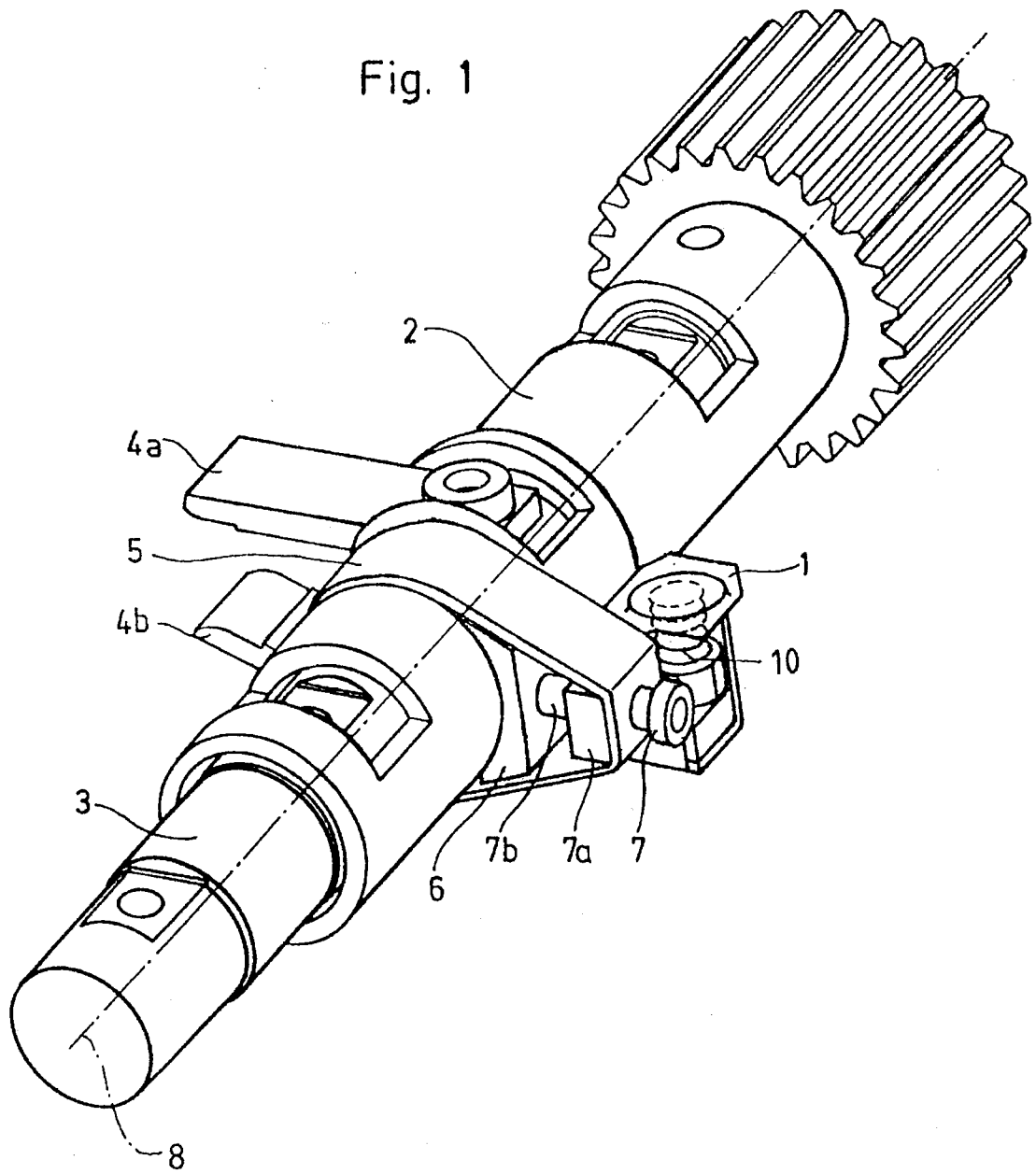
FIG. 1 is a perspective view of an embodiment of the device having the features of the invention for clamping a gripper stop on a gripper bar.

Referring now to the drawings and, first, particularly to FIG. 1 thereof, there is shown therein the device for connecting a machine element to a structural member movable about a longitudinal axis thereof so that the machine element and the structural member are secured against relative rotation according to the invention, the inventive features of which are illustrated by way of example in a device for clamping a gripper stop 1 on a gripper bar 2 of a sheet-fed printing press. A second gripper bar 3 constructed as a solid shaft is rotatably mounted or journalled in the hollow shaft 2 free of play and as smoothly operating as possible. A gripper 4b with a gripper holder or housing is freely rotatably mounted on the hollow shaft 2, the gripper holder being resiliently supported on or spring-braced against the gripper stop 1 by the gripper stop 1 and a spring 10.

A gripper 4a is firmly screwed onto the solid shaft 3. A closing movement of the grippers is effected by counter-rotating the gripper bars 2 and 3; upon the superimposition or closing of the grippers 4a, 4b a torque is applied to the gripper stop 1 by the spring 10.

The operation of the sheet grippers 4a, 4b requires that the gripper stop 1 be accurately positioned in the circumferential direction on the gripper bar 2. The clamping of the gripper stop 1 on the gripper bar 2 must, therefore, be infinitely adjustable in circumferential direction by means of the inventive device, which is illustrated in greater detail in FIGS. 2 and 3. The clamping device according to the invention includes a steel band or belt 5 embracing or enclosing more than 180° of the circumference of the gripper bar 2 and being firmly connected to the gripper stop 1, a thrust piece or pressure plate 6 having an inner side matching the circumferential profile of the gripper bar 2, and at least one clamping bolt 7 formed of a nut member 7a and a bolt member 7b. In a direction radial to the longitudinal axis 8 of the gripper bar 2, the nut member 7a is braced against the steel strap 5 so that, in this direction, both members 7a and 7b are connected to one another in a tension-proof manner. The free end of the bolt member 7b of the clamping bolt 7, when turned against the thrust piece 6, the inner side of which is in contact with the circumference of the gripper bar 2, is effective for pressing the thrust piece 6 against the circumference of the gripper bar 2 by means of the clamping bolt 7. The steel band 5 may form an endless loop so that the nut member 7a is braced against the inner side of the loop of the steel band 5, and the bolt member 7b extends through an opening of the loop.

Figure 2:
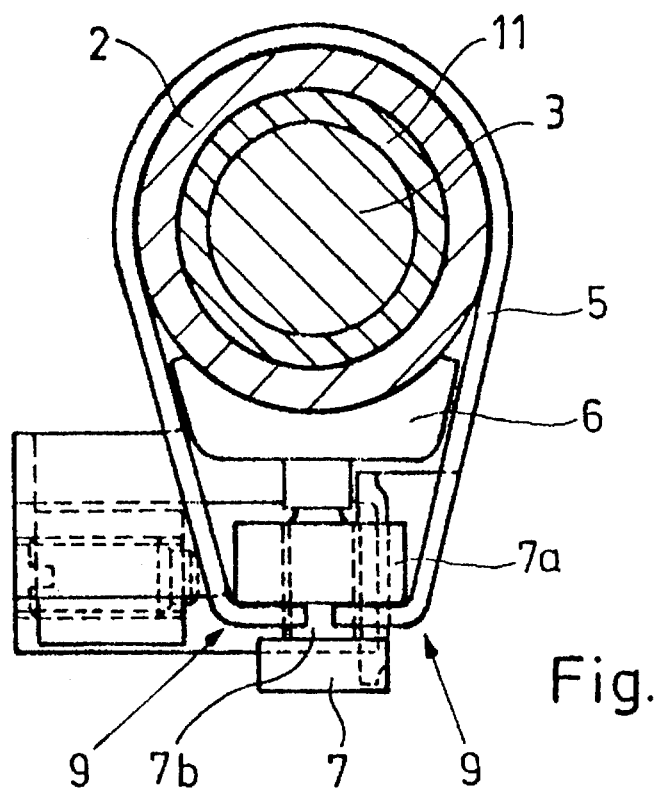
FIG. 2 is a side elevational view of the device according to the invention, as seen in the direction of the longitudinal axis of a hollow gripper bar with a solid gripper bar supported therein, both of the shafts being shown in cross section.
Figure 3:
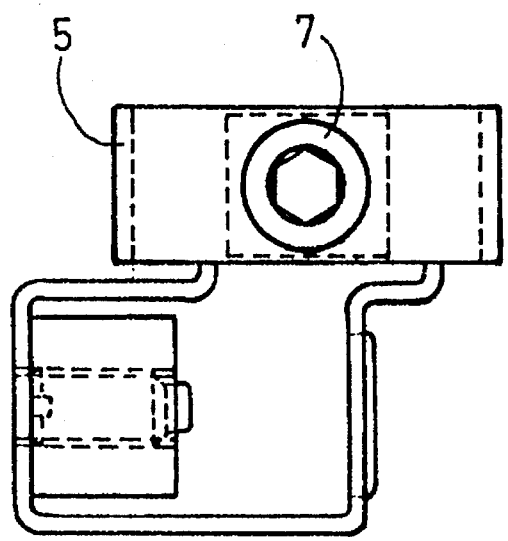
FIG. 3 is a view of FIG. 2 as seen from the bottom thereof and with both gripper bars thereof omitted

The embodiment of the invention, as viewed in FIG. 2, is illustrative of the application of a steel-belt section 5 having ends 9 which are fixed at the nut member 7a so that forces may be transmitted radially to the central longitudinal axis 8 (FIG. 1) of the gripper bar 2. As shown, the ends 9 of the steel-belt section 5 are bent, so as to engage behind the nut member 7a or a projection of the nut member 7a. The steel belt or the steel-belt section 5 is slung or looped about the circumference of the gripper bar 2 more than 180°, and the thrust piece or pressure plate 6 extends substantially over the angular region not covered by the steel belt or steel-belt section 5, so that the clamping forces exerted by the clamping bolt 7 are distributed virtually uniformly over the circumference of the gripper bar 2, thereby avoiding the occurrence of any radial clamping-force peaks. The gripper bar 2 is supported by the steel belt 5 which is considerably more easily deformable than is the gripper bar 2 and can optimally match the shape of the gripper bar. As a result thereof, even when very great clamping forces occur, no cross-sectional deformation of the hollow gripper bar 2 occurs which would otherwise impair the easy-running operation of the control shaft 3 inside the gripper bar 2. Compared with conventional clamping devices for gripper stops on gripper bars, only tensile forces are produced in the steel bands or belts 5, so that the cross section of the steel belt 5 may be kept correspondingly smaller than for the conventional clamping devices. A bearing member 11 is concentrically disposed between the gripper bar 2 and the control shaft 3.

Instead of a steel band or belt, it is conceivable to use a tension member formed of another material. The tensile force for the tension member may be produced by other means such as, for example, one or more clamping means, tensioning eccentrics or the like.

We claim:

1. In combination, a gripper stop of a printing press, a hollow shaft oscillatorily movable about a central longitudinal axis thereof, and a device for clamping the gripper stop at the circumference of the hollow shaft, at one of an infinite number of phase angles with respect to the hollow shaft, so that the gripper stop and the hollow shaft are secured against relative rotation, the device comprising a steel belt embracing more than 180° of the circumference of the hollow shaft and being firmly connected to the gripper stop, a gripper pivotally connected on the hollow shaft and resiliently supported against the gripper stop, a thrust piece having an inner side matching the circumferential profile of the hollow shaft, and at least one clamping bolt having a bolt part and a nut part threaded thereon, said steel belt being fixed to said nut part of said clamping bolt, and said bolt part of said clamping bolt being turnable so as to clamp said thrust piece radially with respect to the central longitudinal axis of the hollow shaft.

2. Clamping device according to claim 1, wherein the hollow shaft is a gripper bar of a sheet-fed printing press.

3. Clamping device according to claim 2, wherein said steel belt is more readily deformable than said gripper bar.

4. Clamping device according to claim 2, wherein said steel belt is formed as an endless loop, said nut part of said clamping bolt is braced against an inner side of said endless loop, said thrust piece is braced against an outer cylindrical surface of said gripper bar, and said clamping bolt is effective between said nut part thereof and said thrust piece.

5. Clamping device according to claim 1, wherein said steel belt has two ends, both of which are fixed to said nut part of said clamping bolt.

6. Clamping device according to claim 5, wherein said ends of said steel belt are bent at an angle to said steel belt, said bent ends, respectively, engaging said nut part.

7. In combination with a hollow gripper shaft of a printing machine, a clamping device clamping a gripper stop on the hollow gripper shaft such that the gripper stop is angularly adjustable at an infinite number of phase angles with respect to the hollow gripper shaft and is securable on the hollow gripper shaft against relative rotation, the clamping device comprising:

a steel belt forming an endless loop embracing more than 180° of the circumference of the hollow gripper shaft, a thrust piece braced against said steel belt, said thrust piece having an inner side matching the hollow gripper shaft and a side braced against the steel belt, and a clamping bolt threadingly projecting through said steel belt and operatively clamping said thrust piece against the hollow gripper shaft while tightening said endless loop around the hollow gripper shaft.

\* \* \* \* \*